Fig. 1

INVENTORS
PAUL M. THOMAS ~AND~
LAWRENCE W. PAT WRIGHT
BY
Willard S. Grover
ATTORNEY.

INVENTORS
PAUL M. THOMAS - AND -
LAWRENCE W. PAT WRIGHT
BY
ATTORNEY.

United States Patent Office 3,011,661
Patented Dec. 5, 1961

3,011,661
APPARATUS FOR HANDLING BUILDING BLOCK PALLETS
Paul M. Thomas and Lawrence W. "Pat" Wright, Phoenix, Ariz., assignors to Builders Equipment Company, Phoenix, Ariz., a corporation of Arizona
Application Nov. 12, 1958, Ser. No. 773,384, which is a division of application Ser. No. 707,606, Jan. 7, 1958, now Patent No. 2,896,800, dated July 28, 1959. Divided and this application Dec. 1, 1960, Ser. No. 73,145
4 Claims. (Cl. 214—16.4)

This application is a division of applicant's abandoned application, Serial No. 773,384, filed November 12, 1958, which last mentioned application was a division of application, Serial No. 707,606, filed January 7, 1958, which issued as Patent No. 2,896,800, on July 28, 1959.

This invention pertains to improvements in an apparatus for handling concrete blocks on pallets from the block making machine to the pallet racks and returning the empty pallets from the racks to the block making machines. More particularly this invention is directed to an automatic apparatus for handling building block pallets.

One of the particular objects of this invention is to provide an improved apparatus for a pallet handler such as shown in Patent 2,803,356 but which automatically and sequentially removes empty pallets from and presents loaded pallets in a pallet rack including means for automatically laterally positioning the pallets relative to the pallet rack slides for accurate and easy entrance of the loaded pallets in the rack without special care being required as to the position or exact dimensions of the racks.

Still another object of this invention is to provide an apparatus which is capable of presenting loaded pallets into the rack in such a way to return the loaded pallets to the exact center of the opening where a pallet has just been removed.

Further features and advantages of this invention will appear from a detailed description of the drawings in which:

FIG. 5 is a sectional view taken from the line 5—5 of FIG. 4 showing fragmentarily, mechanism of the apparatus which elevates laden pallets from the machine conveyor and carries them to respective shelves in the pallet racks as shown in FIG. 3 of the drawings; FIG. 5 further showing apparatus of the invention which controls the elevating mechanism so that laden pallets are elevated into juxtaposition and alignment relative to the shelves in the pallet racks for successively loading and unloading superimposed spaced shelves of the racks with laden pallets and unladen pallets;

As an example of one embodiment of this invention there is shown, FIGS. 1, 2, 3 and 4, a pallet handler for a concrete block machine comprising a main frame 25 including a pair of spaced horizontal rails 26 and 27 supported on suitable upright standards 28 and 29 above the ground level 30. A carriage indicated generally at 31 comprising the transverse side rail members 32 and 33 and the end members 34 and 35 rigidly fixed to the outer ends of the members 32 and 33 is transportably carried on suitable rollers 36a carried on shafts 36 and 37 suitably journaled in the frame 31 and running along on the rails 26 and 27. A suitable reversible electric motor 38 mounted on the carriage 31 is energized for one direction of rotation by closing power contacts 225 by energizing relay coil 224 and for opposite rotation by energizing relay coil 305 to close power contacts 306 and has a drive shaft 39 and a pulley 40 fixed thereon over which operates the belt 41 which in turn operates over the pulley 42 fixed to the shaft 37 so that the motor 38 may be energized to traverse the carriage 31 to the right and left, FIGS. 1 and 2, on the frame 25 of the machine.

A cross movement frame indicated generally at 43 comprises the side members 44 and 45 and connecting pieces 46 and 47 transportably carried on rollers 46 journaled on suitable shafts 47 fixed to the cross movement frame 43. A fluid pressure cylinder 48 is fixed to the cross movement frame 43 and has a double end piston rod 49 with its outer ends suitably fixed to the end members 34 and 35 of the carriage 31. Fluid pressure for the actuating cylinder 48 is derived from a suitable pressure line 50, FIG. 21, connected to the electrically operated reversing control valve 51 from which the control lines 52 and 53 connect to the cylinder 48, so that by appropriately energizing the valve 51 the cross movement frame 43 may be transversed forward and back on the carriage 31 at right angles to the travel of the carriage on the main frame 25.

A vertically disposed rack shaft 54 is journaled against axial movement in the cross movement frame 43 and is rocked back and forth by a fluid pressure cylinder 55 fixed on the cross movement frame 43 and having a piston rod 56 to which is fixed a rack 57 which is in mesh with the rack pinion 58 fixed to the rack shaft 54. Fluid pressure for operating the cylinder 55 is controlled by the electrically operated control valve 59, FIG. 21, to which is connected the pressure supply line 50 and the control supply lines 60 and 61 which in turn are connected to the cylinder 55, so that by properly energizing the valve 59 the rack shaft 54 may be rotated clockwise or counterclockwise, FIG. 1, as required.

Fixed to the lower end of the rack shaft 54 by an appropriate clamp nut means 62 is the top plate 63 of the pallet handler frame indicated generally at 64 comprising the downwardly extending guide members 65, 66, 67 and 68 fixed at their upper ends to the top plate 63, the lower ends of the guide members being held together by a suitable tie plate 69 fixed thereto. Mounted to ride vertically up and down on the guide members 65, 66, 67 and 68 is the pallet supporting platen indicated generally at 70 comprising the main horizontal member 71, the vertical rear members 72 and 73 and the diagonal members 74 to which are journaled suitable guide rollers 75 so that the platen 70 may move vertically up and down on the guideways of the pallet handler frame.

An up and down movement reversible motor 76 is fixed on the plate 77 in turn fixed to the pallet handler frame 64 and drives a suitable reduction unit 78 fixed on the plate 77 which is adapted to wind up or unwind the lifting chain 79 which passes down over the idler sprocket 80 journaled in the pallet handler frame 64 and has its lower end fixed to the member 71 of the platen 70 so that by appropriately energizing the up and down motor 76 the platen 70 may be raised and lowered on the pallet handler frame 64.

The top surface 81 of the horizontal member 71 of the platen 70 is made flat to engage under and support by gravity the steel pallets 82 while inside the platen horizontal member 71 and fixed electro-magnets 83 and 84 having their lower active faces 85 adapted to engage the upper surfaces of the pallets 82, when empty, by magnetic force.

The pallet rack indicated generally at 86 from which empty pallets 82 are to be removed and delivered to the block making machine and which received loaded pallets contain the cement blocks 104 from the block making machine as performed by the pallet handler, comprise upright standards 87, 88 and 89 which are tied together at the bottom by the horizontal members 90 and at the top by the horizontal members 91. Fixed to the upright standards 87, 88 and 89 are the L-shaped guide rails 92 having facing horizontal surfaces 93 which support the under side of the pallets adjacent the outer edges 94 of the pallets 82 and the vertically disposed facing surfaces 95a spaced just slightly further apart than the distance between the outer edges 94 of the pallets, see FIG. 15a.

The concrete block making machine (not shown) has the usual receiving conveyor 95 to receive the empty pallets 82 as they are dropped on the conveyor belt 96 when holding magnets 83 and 84 are deenergized. Above the receiving conveyor 95 is the discharge conveyor 97 having vertically disposed guide surfaces 98 to keep the loaded pallets 82 on the center line 99 as the loaded pallets are delivered from the block making machine out over the top surface 81 of the platen for pick-up and delivery to the pallet rack 86, the center line 100 of the platen 70 coinciding with the center line 99 of the delivering conveyor 97 at the time the pallet picks up the loaded pallets. The receiving conveyor 97 is not critical as to the deposit of empty pallets so that the center line 101 of the empty pallets need not be coincident with the center line 99 as they are dropped on the receiving conveyor. It is important to pick up the loaded pallets so that the center line 102 of the loaded pallets coincide with center line 100 of the platen when the platen picks up the loaded pallets and delivers them to the pallet racks, this being accomplished by accurately and positively stopping the movement to the left, FIGS. 1 and 2, of the carriage 31.

Figure 4:
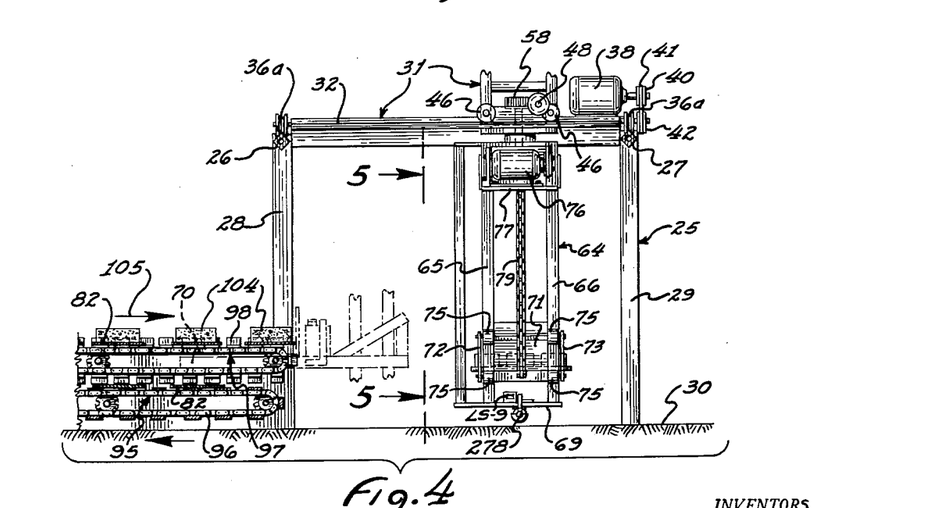
FIG. 4 is a sectional view taken from the line 4—4 of FIG. 2 showing fragmentarily, a discharge conveyor of a conventional block machine relative to the frame and conveying mechanism of the apparatus in accordance with the present invention.

A real problem, however, presents itself in inserting the loaded pallets in between the surfaces 93 of the L-shaped guide rails of the pallet racks since a definite fixed stopped position of travel to the right, FIG. 4, for the cross movement frame 43 cannot be used because it has been found in actual practice that the pallet racks cannot be precisely positioned with the center line 103 of each vertical rack now in the same position every time they are presented to the pallet handler machine because the fork lift trucks used to handle the pallet racks cannot be "spotted" that accurately. Also, the dimensions of the racks vary due to fabrication techniques so that a definite stop engaging the outside surfaces of the racks is of no avail to provide accurate positioning. A still more pressing problem is the variation in spacing between the vertically disposed facing surfaces 95a of the guide rails 92 due to fabrication inaccuracies and distortion of the racks during long use and the further problem of the racks becoming bent and skewed so that the surfaces 95a do not necessarily present themselves in symmetrical alignment with the center lines 103 of the vertical rack rows, FIG. 3. Also, variation in vertical spacing of the surfaces 93 of the guideways brought about by the matters recited above lead to difficulties in the vertical positioning of the pallet handler frame and platen.

The above problems are solved automatically by the instant device wherein all of the movements of the pallet handler, particularly the cross and vertical movements, are determined by an electric probing and control apparatus sensing the actual position of empty pallets in the pallet racks as the basic control for performing the pallet handling operations. To this end the machine is arranged to operate as follows, referring particularly to FIG. 21: Assuming the pallet handler is positioned with its platen at the receiving and discharge conveyors 95 and 97 of the block making machine, FIGS. 1a and 4, the movement of the loaded pallets in the direction indicated by the arrow 105 by the discharge conveyor 97 cause the side edge 106 of the loaded pallet to engage the actuating plate 107 of the limit switch LS-4 connected to control current supply lead L2 connected to one terminal 110 of the secondary winding 111 of the control transformer 112 having a primary winding 113 connected to the leads 114 and 115 connected to the three phase alternating current power supply leads 116, 117 and 118 through the main disconnect switch 119. The other end of limit switch LS–4 is connected to relay coil CR–4 the other end of which is connected to the other control current lead L–1 in turn connected to the other terminal 122 of the secondary winding 111. This energizes relay coil CR–4 closing its normally open contact 123, and since normally closed contacts 124 of relay CR–5 are closed as well as the normally closed extreme upper limit switch LS–6 and hand safety switch 127 is closed, the relay coil UP is energized closing power contacts 129 to energize motor 76 to raise platen 70 as described. The platen raises approximately six inches until limit switch LS–5 carried on the platen and engaging a dog on frame 64 is actuated, which energizes relay CR–5 stopping upward movement by opening normally closed contact 124.

Figure 5:
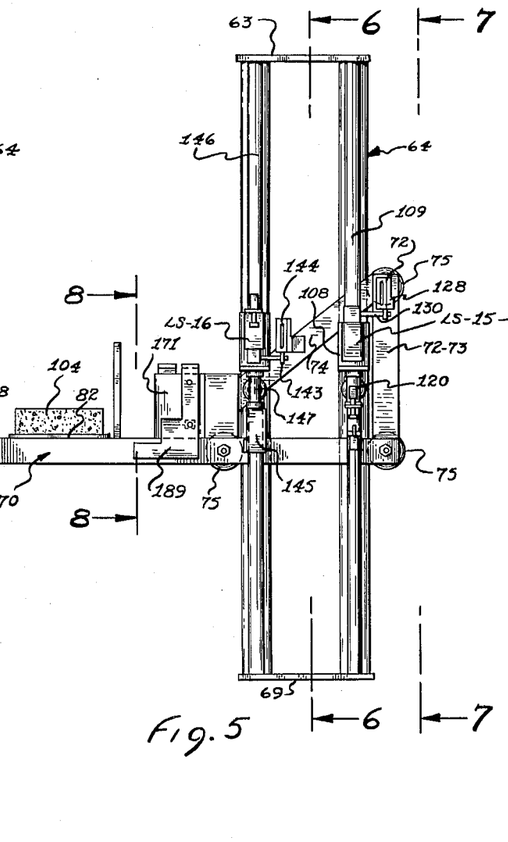
Figure 7:
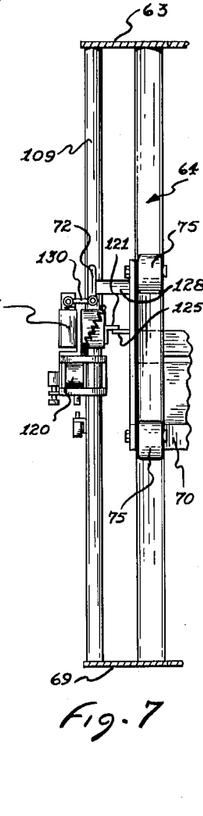
FIG. 7 is a fragmentary side elevational view taken from the line 7—7 of FIG. 6 further showing details of means of the apparatus which controls vertical elevating mechanism of the apparatus in order successively to load and unload laden and unladen pallets relative to vertically spaced superimposed shelves of a pallet supporting rack.

This procedure is followed for all shelves on the pallet rack from the ground up to limit switch LS–5. On shelves higher than the position of limit switch LS–5 control relay CR–14 would not be energized. A limit switch LS–15, FIGS. 5 and 7, is mounted on a slide member 108 arranged to slide vertically on the guide rod 109 fixed at its ends on the top plate 63 and tie plate 69 of the pallet handler frame 64, an electro-magnet 120 being adapted when energized to lock the slide member 108 to the guide rod 109 and when deenergized to allow the slide 108 and limit switch LS–15 to drop downwardly so that abutment lug 121 on the slide member 108 is stopped against abutment lug 125 fixed on the pallet handler frame 64. Limit switch is set to a certain shelf height when the platen engages the top of an empty pallet in the pallet rack at which instant the electro-magnet 120 is energized to hold slide member 108 on the guide rod 109. With LS–15 set for a certain shelf height, the normally closed contacts 126 would bypass CR–5 and the platen 70 would raise until LS–15 is actuated opening its normally closed contacts when the dog 128 on the pallet handler frame 64 engages the operating arm 130 of the limit switch LS–15.

Figure 1:
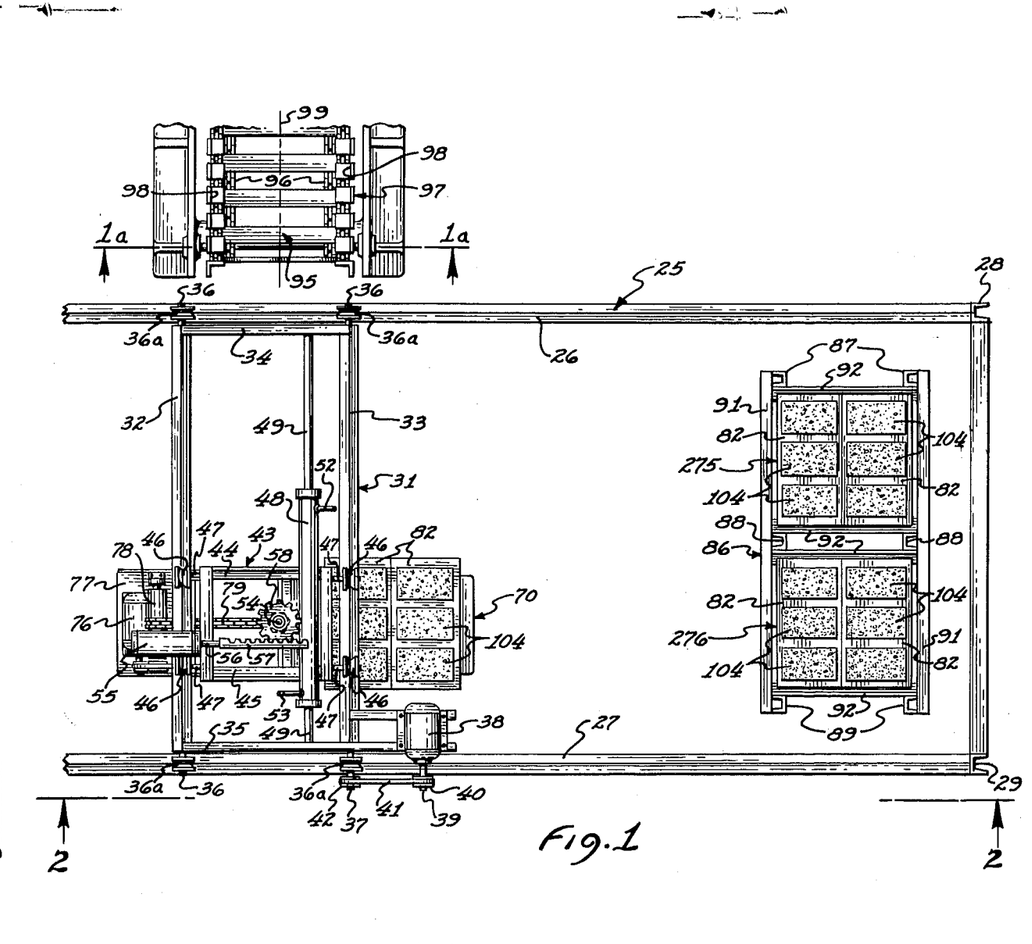
FIG. 1 is a fragmentary plan view of a pallet handler incorporating the features of this invention.
Figure 6:
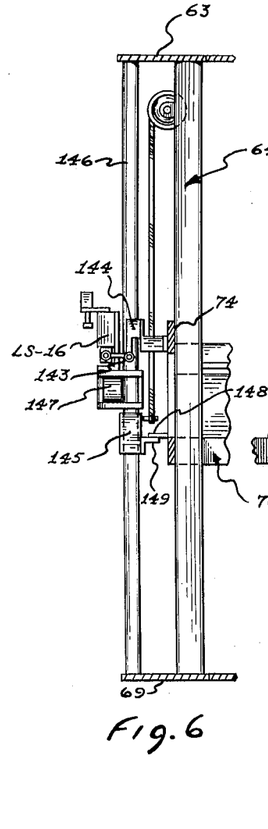
FIG. 6 is a sectional view taken from the line 6—6 of FIG. 5 showing further details of means of the apparatus disposed to control elevating mechanism of the machine or apparatus successively to load and unload vertically spaced superimposed rack shelves on which pallets are carried.
Figures 19, 19A:
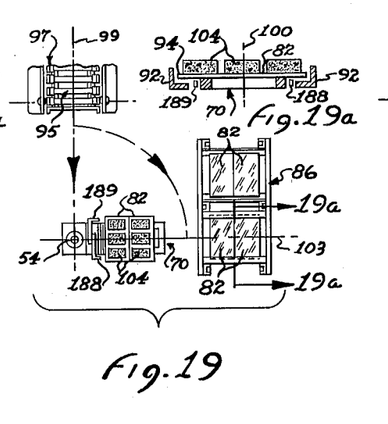
FIG. 19 is a view showing the pallet handler swung to position to insert the loaded pallets into the pallet rack.
FIG. 19a is an enlarged sectional view on the line 19a—19a of FIG. 19.

Regardless of the shelf level, when LS–5 has been actuated and CR–5 energized, the normally open contacts 131 energizes CR–23 and normally open contacts 132 close to operate solenoid 133 of control valve 59 to turn pallet handler frame 64 clockwise, FIG. 1, until it hits a suitable mechanical stop (not shown) with the platen pointed in the direction of the pallet rack 86 as shown in FIGS. 1 and 19. The normally open contacts 134 of CR–5 energizes CR–22 to close contacts 135 so as to energize solenoid 136 of control valve 51 to cause the frame 43 to move backwards away from the block making machine conveyors 95 and 97 until a suitable automatically adjustable mechanical stop, to be subsequently described, is engaged and at this time a limit switch LS–8 is actuated to energize CR–8 with the result that if the shelf in the rack about to be filled is lower than LS–5, the platen can now be lowered to proper height. The contact 137 is closed because CR–5 is held in by its own locking contacts; contact 138 of CR–8 is closed when carriage 31 in rear position; contact 139 is closed because on the lower shelves LS–14 is actuated; normally closed contact 140, this being limit switch set for correct height; contact 141 of CR–10 is closed, CR–10 actuated when platen is on top of empty pallets; contact 142 of CR–17 is closed, platen not on extreme down limit; and hand control safety switch 127 is closed. The platen then drops until connect shelf height is reached whereupon LS–16, FIGS. 5, 6 and 7, has its control arm 143 engaged by dog 144 fixed on the pallet handler frame 64 to open its normally closed points, the limit switch LS–16 being mounted on a slide member 145 sliding up and down on the guide rod 146 fixed at its ends to the top plate 63 and tie plate 69 of the pallet handler frame 64. An electro-magnet 147 is fixed to the slide member 145 and when energized locks the frame 145 to the guide rod 146 and when deenergized allows free sliding movement of the frame on the guide rod. An abutment lug 148 fixed on the platen engages the lower surface of the lug 149 on the slide member 145 to control the up and down movement and position of the limit switch LS–16 from the movement of the platen.

Figures 1A, 2:
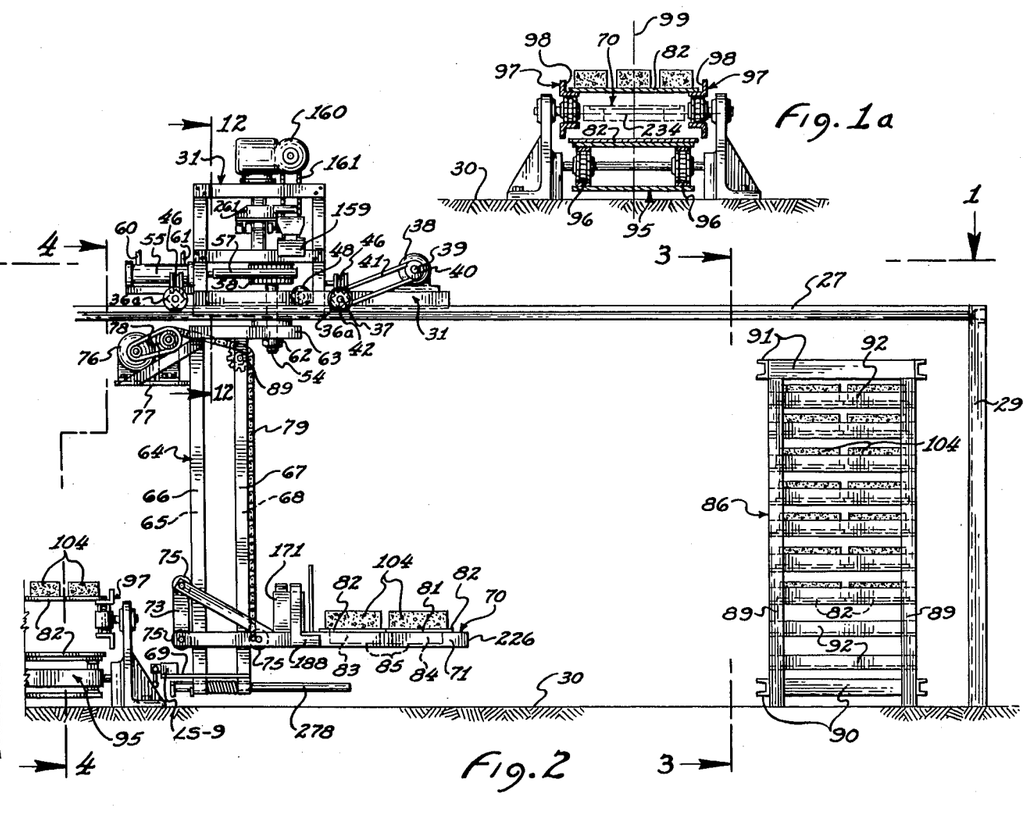
FIG. 1a is an enlarged end view of the block making machine conveyors indicated by the line 1a—1a in FIG. 1.
FIG. 2 is a fragmentary right hand side elevation of the pallet handler indicated by the line 2—2 in FIG. 1.
Figure 3:
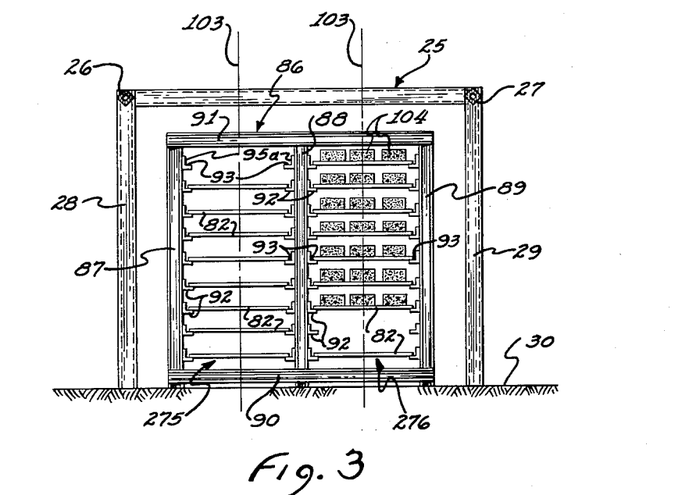
FIG. 3 is a sectional view taken from the line 3—3 of FIG. 2 showing portions of the main frame of the apparatus in accordance with the invention and illustrating a pallet rack having a plurality of empty shelves therein and a further plurality of shelves supporting concrete blocks thereon.
Figures 20, 20A:
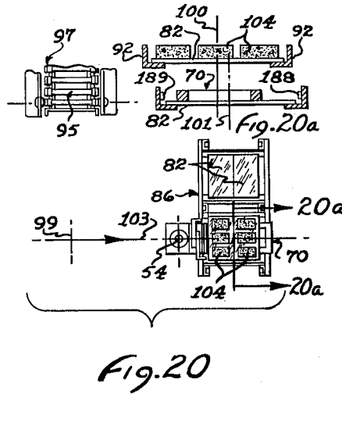
FIG. 20 shows the pallet handler after depositing loaded pallets in the rack and probing and pick up the next below empty pallets.
FIG. 20a is an enlarged fragmentary section on the line 20a—20a of FIG. 20.

The carriage 31 and platen 70 move to the right, FIGS. 1, 2 and 20 since LS–19 closed, 90° interlock to the right; LS–16 closed for correct shelf height on lower shelves; if machine is filling upper shelves LS–15 would be closed; contact 150 of CR–8 closed with carriage 31 in extreme rear position, FIG. 19; contact 151 of CR–9 closed stopping carriage movement to right; contact 152 of CR–10 not opened until empty pallets engaged by underside of platen; and contact 153 of CR–17 only open at end of filling rack with hand safety switch 127 closed. The carriage 31 and platen with loaded pallets then moves toward rack, FIG. 20, until LS–9 is actuated energizing CR–9 by opening contact 151 of CR–9.

Figure 12:
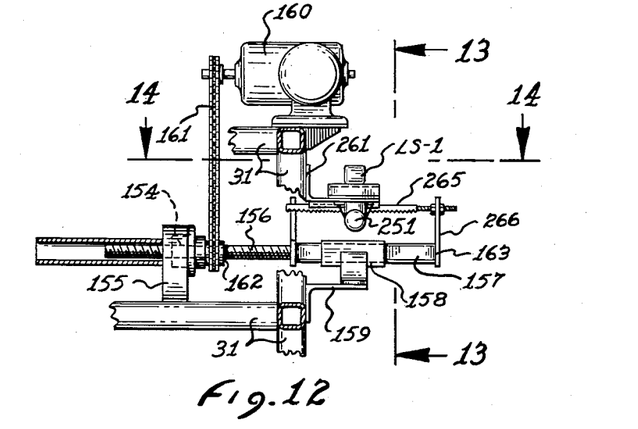
FIG. 12 is an enlarged fragmentary sectional view taken from the line 12—12 of FIG. 2 showing carriage drive and control mechanism of the invention.
Figure 13:
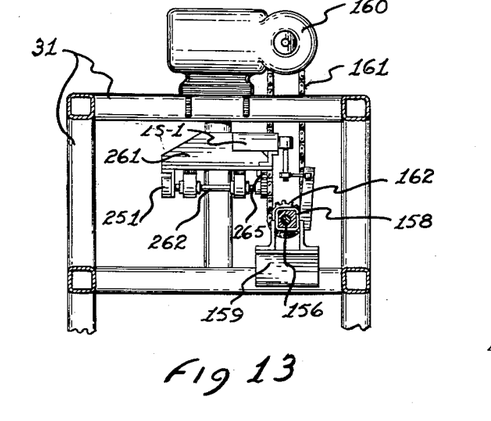
FIG. 13 is an enlarged fragmentary sectional view taken from the line 13—13 of FIG. 12 showing details similar to those shown in FIG. 12 but viewing them from a direction 90 degrees disposed to that as shown in FIG. 12.
Figure 14:
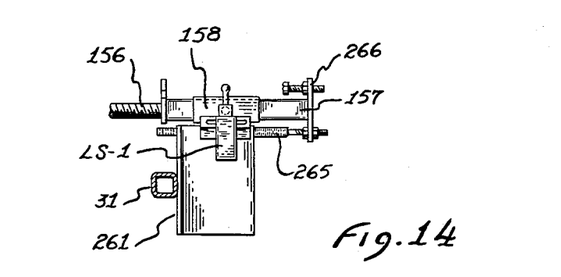
FIG. 14 is an enlarged fragmentary plan sectional view taken from the line 14—14 of FIG. 12 showing chain drive mechanism and limit switch mechanism of the carriage actuating and control mechanism of the invention.

The adjustable stop mechanism for limiting outward travel of the frame 32 away from the block machine conveyors for positioning the platen relative to the center line 103 of the pallet rack comprises the apparatus shown particularly in FIGS. 12, 13 and 14. A rotatable nut 154 is suitably journaled against axial movement in the bearing housing 155 rigidly fixed to the carriage 31 of the machine and operates over an axially adjustable screw 156 having a squared outer and axially slidable but held against rotation in the guide sleeve 158 secured by the bracket 159 to the carriage 31. A reversible adjusting screw motor 160 fixed on the carriage 31 is connected through a chain 161 to a sprocket 162 fixed to the nut 154 so that by suitably energizing the motor 160 the screw 156 and squared outer end may be positioned relative to the carriage 31. An abutment surface 163 on the outer end of the squared outer end 157 is adapted to engage and position the frame 43 in outer cross movement as dictated by the energizing of the motor 160.

When contact 164 of CR–9 closes and if the adjusting screw motor 160 is not adjusting the screw 156 by contact 165 being broken, then the platen drops until stopped mechanically engagement with the top surface of the empty pallet, FIG. 20, and electrically by actuation of LS–10 which energizes CR–10 and breaks down circuit by opening contact 141. When platen drops down to deposit full pallet on surfaces 93 of the rack and to engage the top of an empty pallet the energizing of CR–9, which drops the platen, also opens contact 166 and causes electro-magnet 147 to deenergize to drop LS–16 with the platen. When the platen stops on top of the next empty pallet, LS–10 is actuated, CR–10 energized, closing contact 167 of CR–10; contact 168 of CR–17 is closed; contact 169 of CR–17 is closed and the circuit to the top electro-magnet 147 is again made up locking frame 145 and LS–16 to the guide rod 146. This sequence is repeated each time until the shelves have been filled down to the level of LS–5. At this point electro-magnet 147 and guide frame 145 actuates 160 which energizes CR–14 opening contact 169 thereby breaking the circuit for the top magnet 147. At the same time contact 170 of CR–14 closes, making all energizations and deenergizations pertinent to the bottom electro-magnet 120.

Figures 15, 15A:
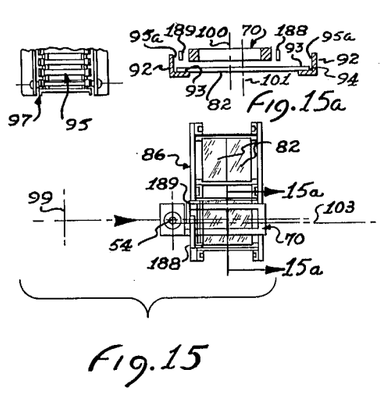
FIG. 15 is a diagrammatic view showing the pallet handler platen entering the pallet rack to pick up empty pallets.
FIG. 15a is an enlarged fragmentary section on the line 15a—15a of FIG. 15.
Figures 16, 16A:
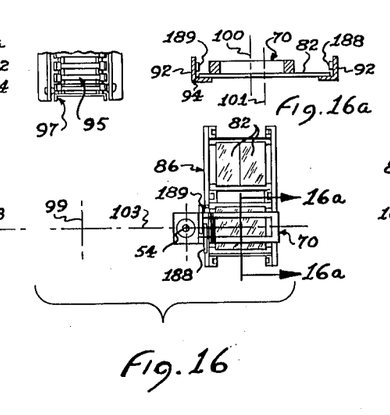
FIG. 16 is a view similar to FIG. 15 but showing the device probing for centerline position of the rack guideways.
FIG. 16a is an enlarged section on the line 16a—16a of FIG. 16.
Figure 17:
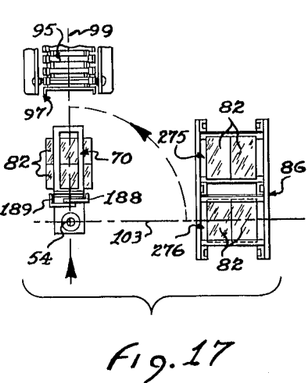
FIG. 17 is a view showing the pallet handler with empty pallets swung to deliver the empty pallets to the block making machine conveyors.
Figures 18, 18A:
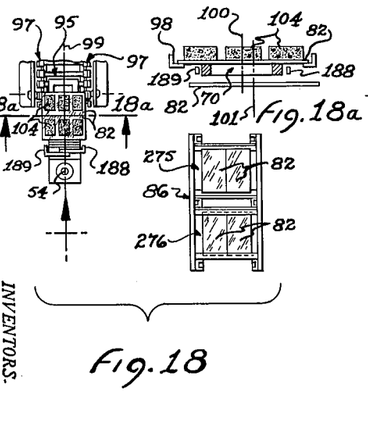
FIG. 18 is a view showing the pallet handler discharging empty pallets and picking up loaded pallets.
FIG. 18a is an enlarged fragmentary section on the line 18a—18a of FIG. 18.

A probing device engaging the vertically disposed facing surfaces 95a—95a of the guide rails 92 of pallet racks, FIGS. 15a and 16a is utilized to sense the degree of misalignment or offset of the axis 100 of the platen and the axis 103 of the pallet rack at the time the platen comes down on top of the empty pallet preparatory to picking up the pallet by the electromagnets 83 and 84; this sensing action being used to energize motor 160 through power contacts 307 operated by relay coil 308 and power contacts 309 operated by relay 310 to adjust the abutment surface 163 the amount of correction necessary to bring axes 100 and 103 in alignment when the platen returns with a loaded pallet to the same guide rails in the rack from which the empty pallet was picked up. This adjustment is made during the time the platen is traveling from the rack to the block machine conveyors so that upon return of the cross movement frame 43, the abutment surface 163 of the screw 156 is correctly positioned to stop the frame 43 in accurate alignment with the pallet rack for insertion of the loaded pallet.

The probing unit comprises a probe box 171 consisting of the sides 172 and 173, the bottom 174, and the top 175 all of which is rigidly secured to the rear top surface 81 of the platen 70. Slidingly mounted on the top surface 176 of the bottom 174 between the inside faces 177a and 177b of the sides 172 and 173 of the probe box 171 is the pinion plate 178 having an upstanding pin 179 fixed therein upon which is journaled the rack pinion 180 which engages a pair of racks 181 and 182 slidably mounted on the top surface 183 of the pinion plate 178 and guided against the side surfaces 177a and 177b. The rack 182 has its outer end 184 projecting through and guided in a suitable opening in the end cover plate 185 fixed to the box 171 while the other rack 181 has its outer end 186 projecting through and guided in a suitable opening in the end cover plate 187 fixed to the box 171. Probe fingers 188 and 189 are fixed to the ends 186 and 184 of the racks 181 and 182 and have contact surfaces 190 and 191 adapted to engage the vertically disposed facing surfaces 95a of the guide rails 92 of the pallet racks.

Figure 21:
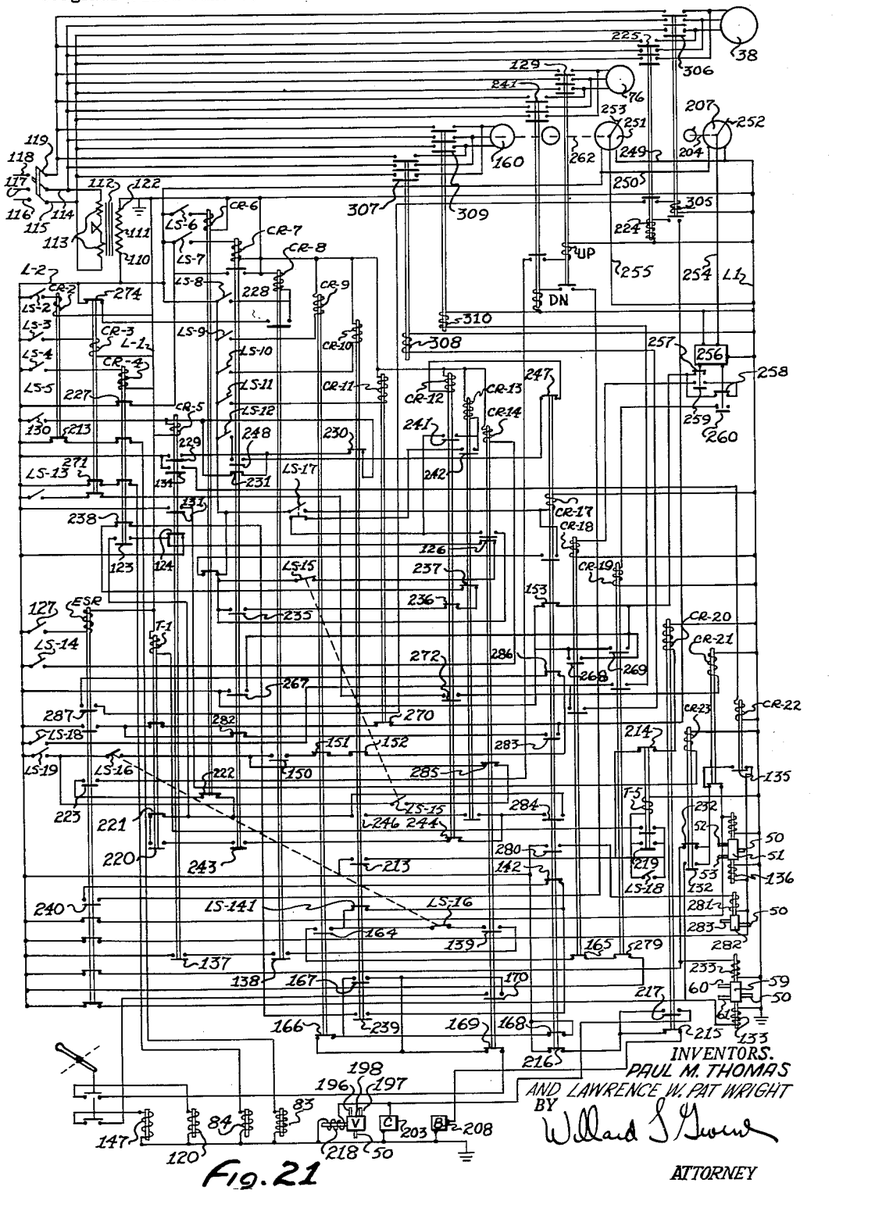
FIG. 21 is a wiring diagram of the operating and control apparatus of the pallet handler.

Fixed in the upper portion of the probe box 171 are the double acting fluid pressure cylinders 192 and 193, cylinder 192 having a piston rod 194 fixed to the probe finger 188 and the cylinder 193 having a piston rod 195 fixed to the probe finger 189 so that by appropriately applying fluid pressure through the lines 196 and 197 from the probe control valve 198, FIG. 21, the cylinders 192 and 193 may move the probe fingers away from each other or retract them toward each other while rotating the rack pinion 180 in the process.

Figures 8, 10, 11:
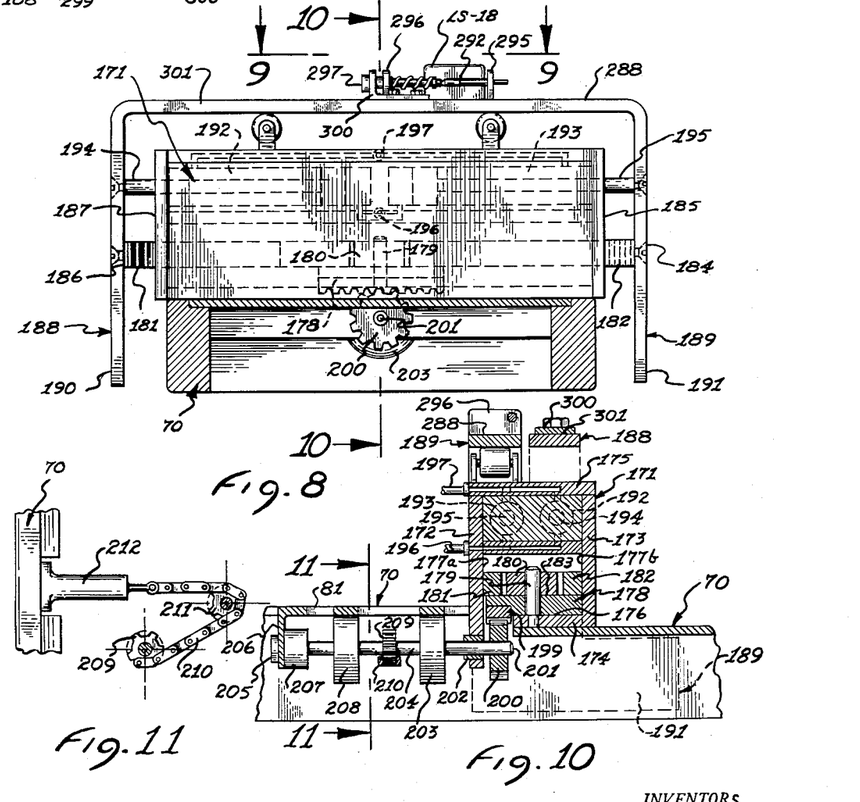
FIG. 8 is a fragmentary sectional view taken from the line 8—8 of FIG. 5 showing details of the probing mechanism in accordance with the present invention.
FIG. 10 is an enlarged fragmentary sectional view taken from the line 10—10 of FIG. 8 showing rack and pinion mechanism and actuating details of the probing mechanism of the invention.
FIG. 11 is an enlarged fragmentary sectional view taken from the line 11—11 of FIG. 10 showing chain and sprocket actuating details of the probing mechanism of the invention.

Fixed to the bottom of the pinion plate 178, FIG. 10, is a rack 199 which engages a gear 200 fixed to the shaft 201 suitably journaled in a bearing 202 in the side 172 of the probe box 171. A magnetic clutch 203 connects or disconnects drive from the shaft 201 to the potentiometer shaft 204 journaled in a suitable bearing 205 in the support backet 206 fixed to the platen 70 and connected to operate the potentiometer 207. An electrically operated brake 208 carried on the platen 70 is adapted when appropriately energized to arrest rotation of the shaft 204 or to release the shaft for free rotation. Also fixed to the shaft 204 is a sprocket 209, FIGS. 10 and 11, to which is fixed a link chain 210 operating over an idler sprocket 211 suitably journaled on the platen 70 and connected to a pull cylinder 212 fixed on the platen 70 and adapted when energized to rotate shaft 204 to return the potentiometer 207 to centered position.

With the platen resting on top of an empty pallet, CR–10 is energized closing contact 213 so that current flows through contact 214 of timer relay T–5, FIG. 21, energizng CR–20 opening contact 215 to break circuit to the electric brake 208 on the potentiometer shaft 204. Contact 216 of CR–17 closed and contact 217 now closed so that the clutch 203 on the potentiometer shaft 204, FIG. 10 is energized connecting shaft 201 to drive shaft 204. Also solenoid 218 of probe control valve 198 is energized to send fluid pressure from supply line 50 through line 196 to cause cylinders 192 and 193 to move both probe fingers 188 and 189 outwardly, FIG. 8, to engage the sides 95a of the rack guide rails 92.

As an example, if the space between surfaces 95a of the rack is at least 26½" wide then limit switch LS–18, FIG. 21, is actuated; this in turn energizes time relay T–5 set for ½ second. If LS–18 remains energized for ½ second then the timer relay T–5 times out and contact 214 opens deenergizing CR–20; its contact 217 being broken deenergizes solenoid 218 of probe valve 198 to now apply fluid pressure in lines to line 197 to retract the probe fingers 188 and 189. Also, the clutch 203 is deenergized at this time to disconnect shaft 201 from shaft 204. Contact 215 of CR–20 now closes energizing brake 208.

If the space between surfaces 95a of the rack had been more than 27¾" wide then even though LS–18 had been actuated it would have been de-actuated in less than ½ second and T–5 would not have had time to time out, consequently the platen would never have moved. However, T–5 did time out and its contact 219 did close and since contact 213 is closed time relay T–1 is energized closing instantaneous contact 220 and closing time open contact 221 already closed, contact 222 closed, and contact 223 of ESR relay closed, safety so that the UP coil is energized closing power contacts 129 to momentarily energize motor 76 lift pallet slightly from rack guideways, whereupon timer relay T–1 times out deenergizing motor 76. Left solenoid 224 is energized closing power contact 225 energizng motor 38 to back out platen from rack by the closing of contacts (TINO) Pat. No. 270 of CR–11. The carriage 31 moves away from the pallet rack until the front end 226 of the platen 70 clears the rack; then limit switch LS–7 is actuated and since contact 227 of CR–4 is closed (LS–4 not actuated, pallets left in rack), CR–7 is energized and is held in by its own holding contact.

As the carriage 31 is still traveling away from the pallet rack, CR–5 relay held in by its holding contact 229, is now deenergized, contact 230 of CR–10 was previously broken and contact 231 is now broken. Contact 131 now open, deenergizing CR–23, opening contact 132 deenergizing solenoid 133 of valve 59 for clockwise swinging and contact 232 of CR–23 now closed which energizes the solenoid 233 of valve 59 which institutes counter-clockwise swing of the frame 64 by cylinder 55 as described. This counter-clockwise swinging movement continues for 90° until stopped by suitable mechanical stop means( not shown) between the frame 64 and cross movement frame 43, fluid pressure being held in the cylinder to hold the frame 64 against said mechanical stop so that the center line 100 of the pallet is aligned with the center line 99 of the block machine conveyors 95 and 97.

The platen now moves up or down to get to the neutral position 234, FIG. 1a, so that the platen may enter between the conveyors. When the pallet handler is loading the top shelves, CR–13 is not energized because the top electro-magnet 147 and frame 145 has not engaged LS–14 yet. The platen now moves down by this circuit. CR–7 contact 235 is closed as recited, CR–12 contact 236 closed, CR–13 contact 237 closed, CR–4 contact 238 closed, CR–10 contact 239 closed, pallets engaged, CR–17 contact 142 bottom limit closed and ESR contact 240 closed. Down solenoid DN is energized closing power contacts 241 to energize motor 76 moving platen down until neutral position 234, FIG. 1a, is reached, actuating LS–12 carried on platen and engaging a dog (not shown) on the frame 64 to open CR–12 contact 236. Had pallet handler been filling lower shalves of rack, then top electro-magnet 147 and frame 145 would have actuated LS–14 energizing CR–14 closing contact 126, CR–12 contact 241 would have closed when platen went down to neutral, and CR–13 becomes energized and CR–13 stays energized by limit switch LS–17 also carried on the platen and engaged by a dog (not shown) on the frame 64 and by CR–13 contact 242.

The platen 70 now backing out of rack wants to raise to neutral. CR–7 contact 243 is closed, CR–12 contact 244 closed, CR–13 contact 245 closed, CR–10 contact 246 closed, pallet engaged, CR–6 contact 222 closed top limit, and ESR contact 223 closed safety. Platen now raises until neutral position 234 is reached actuating limit switch LS–12, CR–17 contact 247 closed, CR–7 contact 248 closed energizing CR–12 opening CR–12 contact 244 breaking circuit.

The potentiometer 207 is electrically connected to a slave potentiometer 251 through leads 249 and 250 as shown in FIG. 21, with control power supply lead L1 being connected to lead 249 and lead L2 being connected to lead 250. The moving arms 252 and 253 of the potentiometers 207 and 251 are each connected by separate leads 254 and 255 to a conventional commercially available control device indicated at 256 responsive to the electrical unbalance caused by the variation in relative angular position of the moving arms 252 and 253 of the potentiometers, suitable control contacts 257, 258, 259 and 260 being operated from said control device 256. Referring to FIGS. 12, 13, and 14, the potentiometer 251 is fixed on a bracket 261 fixed to the frame 31 and is connected to a shaft 262 journaled in suitable bearing 263 fixed to the bracket 261, the shaft 262 having a gear 264 fixed to its other end which engages a rack 265 connected to a plate 266 fixed to the squared outer end 157 of the screw 156 so that the slave potentiometer will be adjusted in accordance with the adjustment of the screw 156 by the motor 160.

The CR–7 contact 267 and if one of the control relay contacts 257—259 or 258—260 of the control device 256 are actuated because of the positions of the potentiometer arms 252 and 253 because the center line 100 of the platen does not agree with the center line 103 of the rack, then either CR–18 or CR–19 will be actuated allowing the motor 160 to rotate the adjusting nut 154 and reposition the stop 163 thereby. CR–18 contact 268 and CR–19 contact 269 are both held in contacts for the adjusting screw motor 160 so that once adjustment starts, removal of actuating power from the original source either CR–7 or CR–17 will not keep nut from finishing adjusting until both potentiometers have been satisfied.

By this time the carriage 31 should have reached the center of the machine in its travel to the left, FIG. 2, LS–11 is actuated which energizes CR–11 opening CR–11 contact 270 breaking current to relay coil 224, if all interlocks have been satisfied, then cross movement frame moves toward the block machine conveyors 95 and 97, FIG. 1a, by the following circuit: the limit switch LS–13 closed, 90° interlock; CR–3 contact 271 closed, forward limit switch; CR–12 contact 272 closed, platen in neutral position 234, FIG. 1a. Approximately ten inches from end of travel of frame 43 LS–2 is actuated energizing CR–2 opening contact 273 which deenergizes front magnet 83 and drop first empty pallet on receiving conveyor 95. The second empty pallet is dropped similarly when LS–3 is actuated as end of forward travel of frame 43 energizing CR–3 opening its contact 274. Also CR–3 contact 271 is opened stopping forward movement of the frame 43, thereby ending one complete cycle.

The above described operation will unload the empty pallets and load full pallets into one complete stall 275 of the pallet rack. In order to shift to and fill other stalls of the rack such as the stall 276, the following operation takes place: The platen 70 enters the rack with the last loaded pallets at the bottom position 277, FIG. 3, having proceeded progressively downwardly through stall 275 as described, and upon complete entry of the platen therein, LS–9 is actuated through push rod 278, FIG. 2, energizing CR–9 and stopping forward movement of the carriage 31. Simultaneously CR–9 contact 164 closes (as described above) and neither CR–18 contact 165 nor CR–19 contact 279 is open since the adjusting nut 154 and motor 160 are not adjusting. CR–10 contact 141 will not open since there are no more empty pallets; platen will drop until LS–17 is actuated energizing CR–17 opening contact 142 stopping down travel of platen.

Under these conditions the following takes place: CR–17 contact 216 opens and the brake 208 holding the master potentiometer 205 in place is released. CR–17 contact 280 closes energizing the solenoid coil 281 of control valve 282 connected to line 283 to the slave potentiometer return cylinder 212 bringing the master potentiometer 205 back into the middle of the travel of its arm 253. CR–17 contact 153 closes furnishing power to potentiometer control box 256 allowing adjusting nut 154 to turn move slave potentiometer 251 to match the master pontentiometer which has been returned to the center of its travel.

The carriage 31 now travels away from the rack. ESR hand safety switch 127 is closed, CR–7 contact 282 is closed, CR–17 contact 283 is closed, energizing left coil 224 closing power contacts 225 for lift travel of carriage 31 until platen clears rack and then LS–7 is actuated, since CR–4 contact 227 is closed, CR–7 is energized and CR–7 contact 282 opens stopping left travel.

The platen now raises to extreme top level of travel by the following circuit: CR–7 contact 243 closed, CR–12 contact 244 will not open even on actuation of LS–12 because of CR–17 contact 247 in CR–12 circuit, CR–17 contact 284 closed, CR–6 contact 222 closed, hand safety ESR contact 223 closed, so that platen will raise until LS–6 is actuated energizing CR–6 stopping up travel.

The carriage 31 now moves towards the rack with the platen moving back into the rack over the top pallet to pick up and return the top empty pallet to the block machine so that room is provided for the first loaded pallets. The movement of the carriage 31 toward the rack is accomplished by the following circuit: Normally open limit switch LS–19 closed, 90° interlock, normally open limit switch closed, platen has carried this LS–15 and sliding member 108 to the top with it, CR–14 contact 285 closed, LS–15 at top, therefore cannot actuate LS–14, CR–8 control 150 closed, cross travel frame 43 in extreme rear position, FIG. 1, CR–9 contact 151 closed, extreme right travel limit switch for carriage 31, CR–10 contact 152 closed, no empty pallets attached to platen, CR–17 contact 286 closed, CR–17 dropped out when platen actuated LS–6, hand safety ESR contact 287 closed.

The carriage 31 travels to the right until LS–9 energizes CR–9 opening contacts 151 breaking circuit stopping right travel. The circuit from here on follows the same pattern as described above. If the adjusting screw 156 is finished adjusting, then platen picks up empty pallets and return to the block machine conveyors to complete the cycle.

Figure 9:
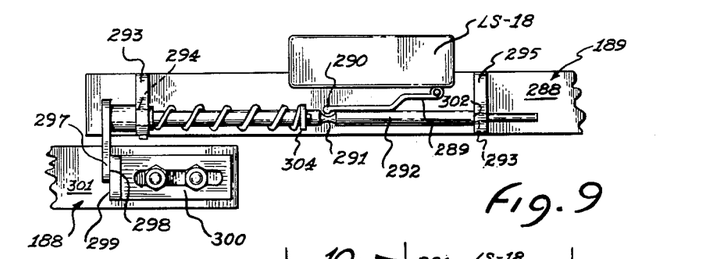
FIG. 9 is an enlarged fragmentary plan view taken from the line 9—9 of FIG. 8 showing limit switch actuating details of the probing mechanism in accordance with the present invention.

On the upper horizontal portion 288 of the probe finger 189, FIG. 9, is fixed the limit switch LS–18 referred to above which has an operating arm 289 having an actuating lug 290 adapted to engage in the annular groove 291 formed in the trip rod 292 slidably mounted in bores 293 and 294 in the bracket 295 and 296 fixed to the probe finger 189. Fixed on the outer end of the trip rod 292 is a dog 297 having an abutment surface 298 adapted to engage an abutment surface 299 on the trip lug 300 adjustably fixed to the horizontal surface 301 of the probe finger 188. The trip rod 292 has an abutment surface 302 engaging the bracket 295 and a compression spring 303 abutting the bracket 296 and the washer 304 fixed to the trip rod 292 normally holds the trip rod abutment 302 against the bracket 295 with the actuating lug 290 on the operating arm 289 of LS–18 positioned in the groove 291. The purpose of this structure is to provide extreme accuracy in tripping LS–18 at the exact point where the guideways in the rack might be too wide and let a pallet drop through.

There has thus been provided a pallet handle comprising a main frame 25 upon which is reciprocatably mounted a carriage adapted to move to and from the pallet rack and upon which carriage a cross movement frame 43 is mounted to move at right angles to the movement of the carriage 31 to and from the receiving and discharging conveyors 95 and 97 of a block making machine. Suspended from the cross movement frame 43 and adapted to rock through 90° of rotation about a vertical axis thereon is the pallet handler frame 64 upon which is vertically reciprocatable the platen which engages the pallets to be handled.

The pallet racks having stalls for accommodating both empty and loaded pallets include guide rails having vertically disposed facing side surfaces of varying width and location relative to the pallet handling machine. Mounted on the platen are oppositely movable probe fingers adapted to engage these vertically disposed facing side surfaces for sensing their position and spacing which is conveyed to a master potentiometer on the platen. An adjustable stop is mounted on the carriage 31 and engaging the cross movement frame to limit the latter's travel on the carriage relative to the position of the pallet rack stalls. Power means are provided to actuate the adjustable stop and a slave potentiometer is connected to the adjustable stop to be actuated thereby in response to the adjustment of the stop. Both potentiometers are connected to a common commercial control device responsive to the information fed to it by the potentiometers to control the operation of the power means for actuating the adjustable stop so as to automatically accurately position the center line of the platen with the center line of the rack stall shelf whenever a loaded pallet is to be inserted therein during the operation of the pallet handler.

While the apparatus herein disclosed and described constitutes a preferred from of the invention, it is also to be understood that any apparatus which is capable of alteration without departing from the spirit of the invention and that such method and commercial adaption as fall within the scope of the appendent claims are intended to be induded herein.

Having thus fully set forth and described this invention what is claimed and desired to be obtained by United States Letters Patent is:

1. In a means for handling building block pallets comprising a first machine disposed to transfer block laden pallets from a building block producing machine to a rack having a plurality of substantially horizontal vertically spaced rack shelf portions: the invention comprising pallet carrying means of said first machine for carrying block laden pallets thereon; vertically movable means for moving said pallet carrying means up and down; horizontally reciprocating means for reciprocating said pallet carrying means horizontally; pallet engaging means connected to said pallet carrying means and engageable with an unladen pallet supported on said rack, fifth means of said first machine responsive to the engagement of said pallet engaging means with said unladen pallet to establish a vertical level at which said vertically movable means will stop for delivery of the next laden pallet so that the horizontally reciprocating means may place said next laden pallet at the correct vertically spaced rack shelf which was previously occupied by said unladen pallet.

2. In a means for handling building block pallets comprising a first machine disposed to transfer block laden pallets from a building block producing machine to a rack having a plurality of substantially horizontal vertically spaced rack shelf portions: the invention comprising pallet carrying means of said first machine for carrying block laden pallets thereon, vertically movable means for moving said pallet carrying means up and down; horizontally reciprocating means for reciprocating said pallet carrying means horizontally; pallet engaging switch means connected to said pallet carrying means and engageable with the top of an unladen pallet supported on said rack, electro-magnetic means of said first machine responsive to the engagement of said pallet engaging switch means with said pallet and thereby operable to establish a vertical level at which said vertically movable means will dispose said pallet carrying means for movement by said horizontally reciprocating means to place the next succeeding laden pallet in the position at which said pallet engaging means previously engaged said unladen pallet.

3. In a means for handling building block pallets comprising a first machine disposed to transfer block laden pallets from a building block producing machine to a rack having a plurality of substantially horizontal vertically spaced rack shelf portions: the invention comprising pallet carrying means of said first machine for carrying block laden pallets thereon; vertically movable means for moving said pallet carrying means up and down; horizontally reciprocating means for reciprocating said pallet carrying means horizontally; pallet engaging electrical switch means connected to said pallet carrying means and engageable with an unladen pallet supported on said rack; a vertically bar of magnetic material stationarily mounted; an electro magnet normally responsive to gravity and slidably mounted thereon; stop means on said vertically movable means to limit gravitational movement of said electro magnet on said bar; and a limit switch connected to said electro magnet and operable to limit vertical movement of said vertically movable means; said electro magnet de-energized by the engagement of said pallet engaging switch means with the top of said pallet and thereby movable by gravity to a lower position of said stop means to establish a vertical level at which said limit switch will stop vertical movement of said vertically movable means to dispose said pallet carrying means at a predetermined vertical level for movement by said horizontally reciprocating means to place the next succeeding laden pallet in the position at which said pallet engaging means previously engaged said unladen pallet.

4. In a means for handling building block pallets comprising a first machine disposed to transfer block laden pallets from a building block producing machine to a rack having a plurality of substantially horizontal vertically spaced rack shelf portions: the invention comprising pallet carrying means of said first machine for carrying block laden pallets thereon; vertically movable means for moving said pallet carrying means up and down; horizontally reciprocating means for reciprocating said pallet carrying means horizontally; pallet engaging electrical switch means connected to said pallet carrying means and engageable with an unladen pallet supported on said rack; a vertical bar of magnetic material stationarily mounted; an electro magnet slidably mounted thereon; elevating means tending to elevate said electro magnet on said bar; stop means on said vertically movable means disposed to force said electro magnet downwardly on said bar; and a limit switch connected to said electro magnet and operable to limit vertical movement of said vertically movable means, said electro magnet energized by the engagement of said pallet engaging switch means with the top of said pallet and thereby magnetically fixed to said bar to establish a vertical level at which said limit switch will stop vertical movement of said vertically movable means to dispose said pallet carrying means at a predetermined vertical level for movement by said horizontally reciprocating means to place the next succeeding laden pallet in the position at which said pallet engaging means previously engaged said unladen pallet.

References Cited in the file of this patent

UNITED STATES PATENTS

| | | |
|---|---|---|
| 2,482,211 | Reichardt | Sept. 30, 1949 |
| 2,803,356 | Thomas | Aug. 20, 1957 |